(12) United States Patent
Kharatiyan

(10) Patent No.: US 9,194,983 B2
(45) Date of Patent: *Nov. 24, 2015

(54) OPTICAL RETARDATION FILM AND METHOD OF PRODUCTION THEREOF
(71) Applicant: Crysoptix K.K., Tokyo (JP)
(72) Inventor: Ellina Kharatiyan, Moscow (RU)
(73) Assignee: Crysoptix K.K., Tokyo (JP)
( * ) Notice: Subject to any disclaimer, the term of this patent is extended or adjusted under 35 U.S.C. 154(b) by 12 days.

This patent is subject to a terminal disclaimer.

(21) Appl. No.: 14/286,487
(22) Filed: May 23, 2014
(65) Prior Publication Data
US 2014/0350214 A1  Nov. 27, 2014

Related U.S. Application Data

(63) Continuation of application No. 13/182,478, filed on Jul. 14, 2011, now Pat. No. 8,865,313.
(60) Provisional application No. 61/364,877, filed on Jul. 16, 2010.

(51) Int. Cl.
*G02B 1/08* (2006.01)
*B05D 3/00* (2006.01)
(Continued)

(52) U.S. Cl.
CPC ........ *G02B 1/08* (2013.01); *B05D 3/007* (2013.01); *C08G 69/32* (2013.01); *C08L 77/10* (2013.01);
(Continued)

(58) Field of Classification Search
CPC .......................................................... G02B 1/08
USPC .................................. 528/337, 332; 427/162
See application file for complete search history.

(56) References Cited

U.S. PATENT DOCUMENTS

| 5,276,182 A | 1/1994 | Cardin et al. |
| 7,115,751 B2 | 10/2006 | Maeda et al. |

(Continued)

FOREIGN PATENT DOCUMENTS

WO   2010064194 A2   6/2010

OTHER PUBLICATIONS

PCT, International Search Report and Written Opinion in International Application No. PCT/IB2011/053156, Oct. 25, 2011, 10 pages.
(Continued)

*Primary Examiner* — Duc Truong
(74) *Attorney, Agent, or Firm* — FisherBroyles LLP; Adam K. Whiting

(57) ABSTRACT

The present invention relates generally to the field of organic chemistry and particularly to the optical retardation films for liquid crystal displays. The present invention provides an optical film comprising a substrate having front and rear surfaces, and at least one solid retardation layer on the front surface of the substrate. Said solid retardation layer comprises rigid rod-like macromolecules comprising n organic units of the first type having general structural formula I and

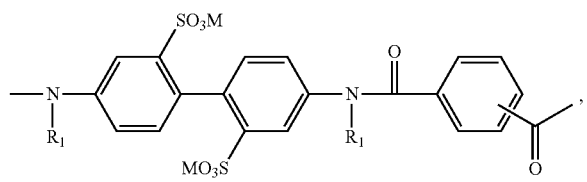

(I)

and k organic units of the second type having general structural formula II

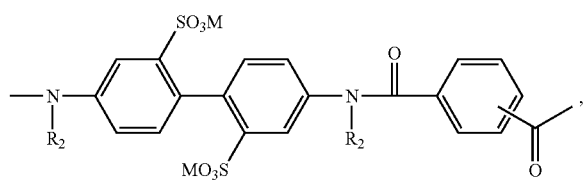

(II)

21 Claims, 9 Drawing Sheets

(51) Int. Cl.
    G02B 5/30      (2006.01)
    C08G 69/32     (2006.01)
    C08L 77/10     (2006.01)
    C09K 19/38     (2006.01)
    G02B 1/04      (2006.01)
    G02F 1/13363   (2006.01)

(52) U.S. Cl.
    CPC .............. C09K 19/3809 (2013.01); G02B 1/04 (2013.01); G02B 5/3083 (2013.01); G02F 1/133634 (2013.01); Y10T 428/31551 (2015.04); Y10T 428/31562 (2015.04); Y10T 428/31725 (2015.04)

(56) References Cited

U.S. PATENT DOCUMENTS 8,865,313 B2 * 10/2014 Kharatiyan ............... 428/423.5
2005/0123800 A1  6/2005 Kim et al.

OTHER PUBLICATIONS

Li et al., "Molecular weight and film thickness effects on linear optical anisotropy of 6FDA-PFMB polyimides," Polymer, vol. 38, No. 13, 1997, pp. 3223-3227.
Funaki et al., "Shear-Induced Mesophase Organisation of Polyanionic Rigid Rods in Aqueous Solution," Langmuir, vol. 20, 2004, pp. 6518-6520.
Sakar et al., "Rigid rod water-soluble polymers," J.Appl.Polymer Science, vol. 62, 1996, pp. 393-408.
Yamashida et al., "Novel material for coatable negative C-plate retarder," IDW 2008 Digest, 2008, pp. 1725-1728.
Li et al., "Polyimide films as negative birefringent compensators for normally white twisted nematic liquid crystal displays," Polymer vol. 37 No. 23, 1996, pp. 5321-5325.
Geivandov et al., "Novel Coatable Negative C-plate Retarder," IDW 2009 Digest, 2009, pp. 867-870.
Yaroschuk et al., "Light induced structures in liquid crystalline side-chain polymers with azolenzene functional groups," Journal of Chemical Physics, vol. 114, No. 12, Mar. 22, 2001, pp. 5330-5337.

* cited by examiner

OPTICAL RETARDATION FILM AND METHOD OF PRODUCTION THEREOF

This application is a CON of Ser. No. 13/182,478 filed Jul. 14, 2011 now U.S. Pat. No. 8,865,313, which claims benefit of 61/364,877 filed Jul. 16, 2010.

FIELD OF THE INVENTION

The present invention relates generally to the field of organic chemistry and particularly to the optical retardation films for liquid crystal displays.

BACKGROUND OF THE INVENTION

The liquid crystal display (LCD) technology has made a remarkable progress in the past years. Cellular phones, laptops, monitors, TV sets and even public displays based on LCD panels are presented on the market. The market of LCD is expected to keep growing in the near future and sets new tasks for researchers and manufacturers. One of the key growth sustainers is product quality improvement along with cost reduction.

LCD size has exceeded 100 inch by diagonal and it imposes stronger restrictions onto the quality of optical components. Retardation films should deliver a very small color shift and ability to provide higher contrast ratio at wide viewing angles in order to be used for high-quality viewing of large displays.

There are still some disadvantages of LCD technology which impact the quality of liquid crystal displays. One of disadvantages is a decrease of contrast ratio at oblique viewing angles. In conventional LCD the viewing angle performance is strongly dependent upon polarizers' performance. Typical LCD comprises two dichroic polarizers crossed at 90°. However, at oblique angles the angle between projections of their axes deviates from 90°, and the polarizers become uncrossed. The light leakage increases with increasing off-axis oblique angle. This results in low contrast ratio at wide viewing angle along the bisector of crossed polarizers. Moreover, liquid crystal cell placed between crossed polarizers makes leakage even higher.

Thus, modern technology requires development of new optical elements based on new materials with controllable properties. In particular, modern visual display systems require use of an optically anisotropic birefringent film that is optimized for the optical characteristics of an individual LCD module.

Various polymer materials are known in the prior art, which are intended for use in the production of optically anisotropic birefringent films. Optical films based on these polymers acquire optical anisotropy through uniaxial extension.

A triacetyl cellulose films are widely used as negative C plates in modern LCD polarizers. However, their disadvantage is a low value of birefringence. Thus, thinner films with high retardation value are desired for making displays cheaper and lighter.

Besides the stretching of the amorphous polymeric films, other polymer alignment techniques are known in the art. Thermotropic liquid crystalline polymers (LCP) can provide highly anisotropic films characterized by various types of birefringence. Manufacturing of such films comprises coating a polymer melt or solution on a substrate; for the latter case the coating step is followed by the solvent evaporation. Additional alignment actions are involved as well, such as an application of the electric field, using of the alignment layer or coating onto a stretched substrate. The after-treatment of the coating is set at a temperature at which the polymer exhibits liquid crystalline phase and for a time sufficient for the polymer molecules to be oriented. Examples of uniaxial and biaxial optical films production can be found in multiple patent documents and scientific publications.

In the article by Li et al, Polymer, vol. 38, no. 13, pp. 3223-3227 (1997) the authors noted that some polymers provide optical anisotropy which is fairly independent of film thickness. They described special molecular order of rigid-chain polymers on the substrate. The director of molecules is preferentially in the plane of the substrate and has no preferred direction in the plane. However, the described method has a technological drawback. After applying the solution onto a hot substrate, temperature was controlled at 60° C. to gently evaporate the solvent and dry the film for 60 min. After that the samples were dried at an elevated temperature of 150° C. for 24 h in a vacuum oven to remove any residual solvent. The last step severely restricts the product commercialization and does not allow using the plastic substrate for LCD manufacturing.

Shear-induced mesophase organization of synthetic polyelectrolytes in aqueous solution was described by T. Funaki et al. in *Langmuir*, vol. 20, 6518-6520 (2004). Poly(2,2'-disulfonylbenzidine terephtalamide (PBDT) was prepared by an interfacial polycondensation reaction according to the procedure known in the prior art. Using polarizing microscopy, the authors observed lyotropic nematic phase in aqueous solutions in the concentration range of 2.8-5.0 wt %. Wide angle X-ray diffraction study indicated that in the nematic state the PBDT molecules show an inter-chain spacing, d, of 0.30-0.34 nm, which is constant regardless of the concentration (2.8-5.0 wt %). The d value is smaller than that of the ordinary nematic polymers (0.41-0.45 nm), suggesting that PBDT rods in the nematic state have a strong inter-chain interaction in the nematic state to form the bundle-like structure despite the electrostatic repulsion of sulfonate anions. In the concentration range from 2 to 2.8 wt % a shear-induced birefringent (SIB) mesophase was observed.

The rigid rod water-soluble polymers were described by N. Sarkar and D. Kershner in Journal of Applied Polymer Science, Vol. 62, pp. 393-408 (1996). The authors suggest using these polymers in different applications such as enhanced oil recovery. For these applications, it is essential to have a water soluble shear stable polymer that can possess high viscosity at very low concentration. It is known that rigid rod polymers can be of high viscosity at low molecular weight compared with the traditionally used flexible chain polymers such a hydrolyzed poly-acrylamides. New sulfonated water soluble aromatic polyamides, polyureas, and polyimides were prepared via interfacial or solution polymerization of sulfonated aromatic diamines with aromatic dianhydrides, diacid chlorides, or phosgene. Some of these polymers had sufficiently high molecular weight (<200 000 according to GPC data), extremely high intrinsic viscosity (~65 dL/g), and appeared to transform into a helical coil in salt solution. These polymers have been evaluated in applications such as thickening of aqueous solutions, flocculation and dispersion stabilization of particulate materials, and membrane separation utilizing cast films.

The present invention provides solutions to the above referenced disadvantages of the optical films for liquid crystal display or other applications.

SUMMARY OF THE INVENTION

In one aspect, the present invention provides an optical film comprising a substrate having front and rear surfaces, and at least one solid retardation layer on the front surface of the substrate; said solid retardation layer comprises rigid rod-like macromolecules comprising n organic units of the first type having general structural formula I

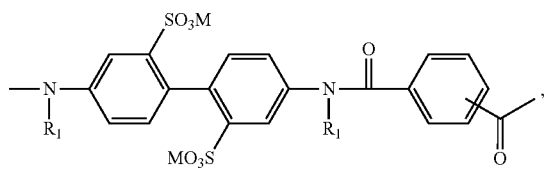

and
k organic units of the second type having general structural formula II

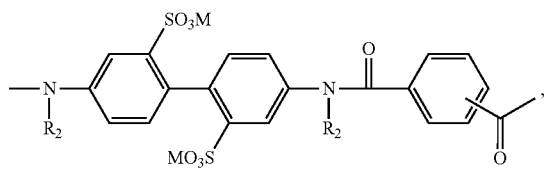

wherein n is in the range from 0 to 10,000, and k is in the range from 0 to 10,000, sum n+k≥10, $R_1$ and $R_2$ are side-groups independently selected from the list comprising —H, -alkyl, —$(CH_2)_m SO_3 M$, —$(CH_2)_m Si(O$-alkyl$)_3$, —$CH_2$-aryl, —$(CH_2)_m OH$, wherein m is number from 1 to 18, and in case —H is one of the side groups, then its fraction should not exceed 50% of total number of side-groups in the macromolecule, M is counterion selected from the list comprising $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Al^{3+}$, $Ce^{3+}$, $Y^{3+}$, $Yb^{3+}$, $Gd^{3+}$, $Zr^{4+}$ and $NH_{4-p} Q_p^+$, where Q is selected from the list comprising linear and branched (C1-C20) alkyl, (C2-C20) alkenyl, (C2-C20) alkynyl, and (C6-C20)arylalkyl, and p is 0, 1, 2, 3 or 4. The organic units of the first type and the organic units of the second type are contained in the rigid rod-like macromolecules in any random or orderly sequence. The solid optical retardation layer is a negative C-type where the rigid rod-like macromolecules are isotropically oriented in the plane of the substrate and the solid optical retardation layer is substantially transparent to electromagnetic radiation in the visible spectral range.

In the further aspect, the present invention provides a method of producing an optical film, comprising the following steps: a) preparation of an isotropic solution of rigid rod-like macromolecules comprising n organic units of the first type having general structural formula I

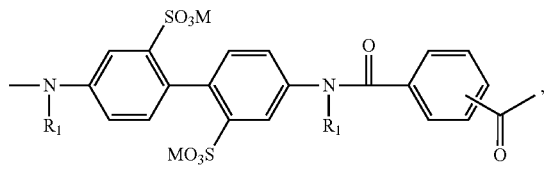

and
k organic units of the second type having general structural formula II

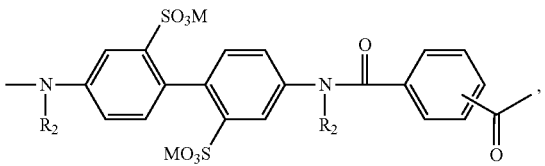

wherein n is in the range from 0 to 10,000, and k is in the range from 0 to 10,000, sum n+k≥10, $R_1$ and $R_2$ are side-groups independently selected from the list comprising —H, -alkyl, —$(CH_2)_m SO_3 M$, —$(CH_2)_m Si(O$-alkyl$)_3$, —$CH_2$-aryl, —$(CH_2)_m OH$, wherein m is number from 1 to 18, and in case —H is one of the side groups, then its fraction should not exceed 50% of total number of side-groups in the macromolecule, M is counterion independently selected from the list comprising $H^+$, $Na^+$, $K^+$, $Li^+$, $Cs^+$, and $NH_{4-p} Q_p^+$, where Q are independently selected from the list comprising linear and branched (C1-C20) alkyl, (C2-C20) alkenyl, (C2-C20) alkynyl, and (C6-C20)arylalkyl, and p is 0, 1, 2, 3 or 4, wherein the organic units of the first type and the organic units of the second type are contained in the rigid rod-like macromolecules in any random or orderly sequence; b) application of a liquid layer of the solution onto a substrate, wherein the rigid rod-like macromolecules are isotropically oriented in the plane of the substrate and the liquid layer is substantially transparent for electromagnetic radiation in the visible spectral range; and c) drying to form a solid optical retardation layer, wherein during the drying step a viscosity of the solution increases without mesophase formation.

In yet further aspect, the present invention provides a rigid rod-like macromolecule comprising n organic units of the first type having general structural formula I

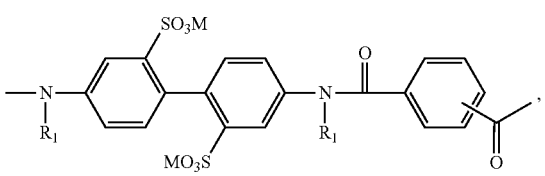

and
k organic units of the second type having general structural formula II

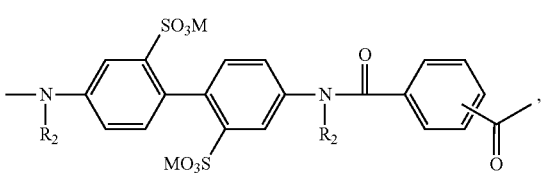

wherein n is in the range from 0 to 10,000, and k is in the range from 0 to 10,000, sum n+k≥10, $R_1$ and $R_2$ are side-groups independently selected from the list comprising —H, -alkyl, —$(CH_2)_m SO_3 M$, —$(CH_2)_m Si(O$-alkyl$)_3$, —$CH_2$-aryl, —$(CH_2)_m OH$, wherein m is a number from 1 to 18, and in case —H is one of the side-groups, then total number of —H should not exceed 50% of total number of side-groups ($R_1$ and $R_2$) in the macromolecule, and M is counterion selected from the list comprising $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Al^{3+}$, $Ce^{3+}$, $Y^{3+}$, $Yb^{3+}$, $Gd^{3+}$, $Zr^{4+}$ and $NH_{4-p}Q_p^+$, where Q is selected from the list comprising linear and branched (C1-C20) alkyl, (C2-C20) alkenyl, (C2-C20) alkynyl, and (C6-C20)arylalkyl, and p is 0, 1, 2, 3 or 4. The organic units of the first type and the organic units of the second type are contained in the rigid rod-like macromolecules in an arbitrary sequence.

In another aspect the invention provides a method of synthesis of a rigid rod-like macromolecule comprising n organic units of the first type having general structural formula I

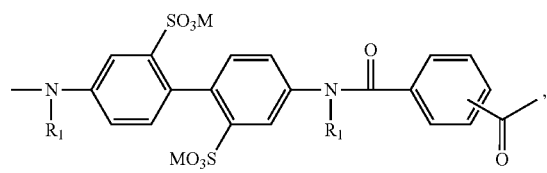

(I)

and k organic units of the second type having general structural formula II

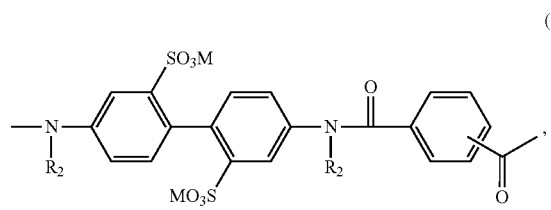

(II)

wherein n is in the range from 0 to 10,000, and k is in the range from 0 to 10,000, sum n+k≥10, $R_1$ and $R_2$ are side-groups independently selected from the list comprising —H, -alkyl, —$(CH_2)_mSO_3M$, —$(CH_2)_mSi(O\text{-alkyl})_3$, —$CH_2$-aryl, —$(CH_2)_mOH$, wherein m is a number from 1 to 18, and in case —H is one of the side-groups, then total number of —H should not exceed 50% of total number of side-groups ($R_1$ and $R_2$) in the macromolecule, and M is counterion selected from the list comprising $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Al^{3+}$, $Ce^{3+}$, $Y^{3+}$, $Yb^{3+}$, $Gd^{3+}$, $Zr^{4+}$ and $NH_{4-p}Q_p^+$, where Q is selected from the list comprising linear and branched (C1-C20) alkyl, (C2-C20) alkenyl, (C2-C20) alkynyl, and (C6-C20)arylalkyl, and p is 0, 1, 2, 3 or 4, wherein the organic units of the first type and the organic units of the second type are contained in the rigid rod-like macromolecules in an arbitrary sequence, comprising polymerization of at least one aromatic diamine monomer

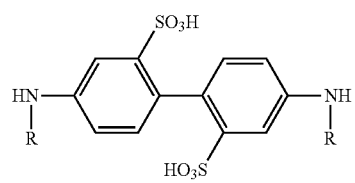

where R is a side-group which is independently for different monomers selected from the list comprising —H, alkyl, —$(CH_2)_mSO_3M$, —$(CH_2)_mSi(O\text{-alkyl})_3$, —$CH_2$-aryl, and —$(CH_2)_mOH$, wherein m is a number from 1 to 18, and at least one difunctional electrophile monomer

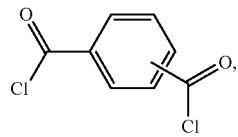

an acid acceptor, and at least two solvents, wherein one solvent is water and another solvent is water-immiscible organic solvent, and wherein an optimal pH of the polymerization step is approximately between 7 and 10.

DETAILED DESCRIPTION OF THE INVENTION

Figure 1:
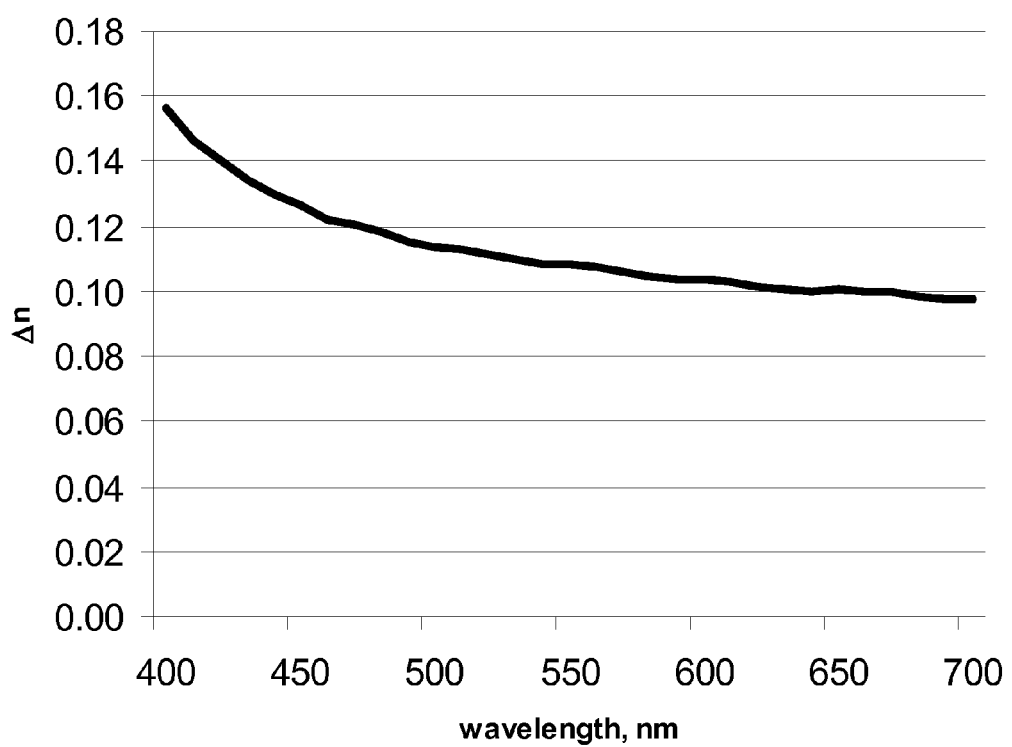
FIG. 1 shows the spectral dispersion of out-of-plane birefringence $\Delta n_{yz}=\Delta n_{xz}=\Delta n$ of a solid optical retardation layer of negative C-type according to the present invention.

The general description of the present invention having been made, a further understanding can be obtained by reference to the specific preferred embodiments, which are given herein only for the purpose of illustration and are not intended to limit the scope of the appended claims.

Definitions of various terms used in the description and claims of the present invention are listed below.

The term "visible spectral range" refers to a spectral range having the lower boundary approximately equal to 400 nm, and upper boundary approximately equal to 700 nm.

The term "retardation layer" refers to an optically anisotropic layer which is characterized by three principal refractive indices ($n_x$, $n_y$, and $n_z$), wherein two principal directions for refractive indices $n_x$ and $n_y$ belong to xy-plane coinciding with a plane of the retardation layer and one principal direction for refractive index ($n_z$) coincides with a normal line to the retardation layer.

The term "optically anisotropic retardation layer of negative C-type" refers to an optical layer which refractive indices $n_x$, $n_y$, and $n_z$ obey the following condition in the visible spectral range: $n_z<n_x=n_y$, wherein the in-plane birefringence $\Delta n_{xy}=n_x-n_y$ is zero, and out-of-plane birefringence $\Delta n_{xz}=\Delta n_{yz}>0$.

As used herein, a "front substrate surface" refers to a surface facing a viewer. A "rear substrate surface" refers to the surface opposite to the front surface.

The present invention provides an optical film as disclosed hereinabove. In disclosed optical film, the side-groups $R_1$ and $R_2$ impede formation of lyotropic liquid crystal of the organic compound or its salts in a suitable solvent. In one embodiment of the disclosed optical film, said solid retardation layer is an uniaxial retardation layer possessing two refractive indices ($n_x$ and $n_y$) corresponding to two mutually perpendicular directions in the plane of the substrate and one refractive index ($n_z$) in the normal direction to the plane of the substrate, and wherein the refractive indices obey the following condition: $n_z < n_x = n_y$, and wherein the in-plane birefringence $\Delta n_{xy} = n_x - n_y$ is zero, and out-of-plane birefringence $\Delta n_{xz} = \Delta n_{yz} > 0$. In yet another embodiment of the disclosed optical film, the substrate material is selected from the list comprising polymer and glass.

The present invention also provides a method of producing the optical film as disclosed hereinabove. In the disclosed method, the side-groups $R_1$ and $R_2$ impede formation of lyotropic liquid crystal of the organic compound or its salts in a suitable solvent. In one embodiment of the disclosed method, the salt of the organic compound is selected from the list comprising alkaline metal salts, triethylammonium salt and ammonium salt. In another embodiment of the disclosed method, the substrate material is selected from the list comprising polymer and glass.

In one embodiment of the present invention, a method further comprises a pre-treatment step before the application onto the substrate. In another embodiment of the disclosed method, the pre-treatment comprises the step of making the surface of the substrate hydrophilic. In yet another embodiment of the disclosed method, the pre-treatment further comprises application of a planarization layer.

In one embodiment of the present invention, a method further comprises a post-treatment step comprising a treatment with a solution of any aqueous-soluble inorganic salt with a cation selected from the list comprising $H^+$, $Ba^{2+}$, $Pb^{2+}$, $Ca^{2+}$, $Mg^{2+}$, $Sr^{2+}$, $La^{3+}$, $Zn^{2+}$, $Zr^{4+}$, $Al^{3+}$, $Ce^{3+}$, $Y^{3+}$, $Yb^{3+}$, $Gd^{3+}$ and any combination thereof soluble in water or any solvent mixable with water.

In another embodiment of the disclosed method, the solvent is selected from the list comprising water, alkaline aqueous solutions, dimethylsulfoxide, dimethylformamide, dimethylacetamide, tetrahydrofurane, dioxane, and combination thereof.

In yet another embodiment of the disclosed method, the application step is carried out using a coating technique selected from the list comprising spin-coating, spray-coating, printing, casting and molding. In still another embodiment of the disclosed method, an isotropic solution is used in the application step. In one embodiment of the disclosed method, the isotropic solution comprises surfactant.

The present invention provides a rigid rod-like macromolecule as disclosed hereinabove.

The present invention provides a method of synthesis of the disclosed rigid rod-like macromolecule as disclosed herein.

Acid acceptor is a base compound that is added to the reaction mixture to absorb the released acid and maintaining a basic pH. The acid acceptor can be selected from the list comprising (but not limited to) alkalis, carbonates, trialkylamines and other base compounds Two solvents are added to the initial mixture of monomers, of which one solvent is water and it serves as a solvent to the first monomer; and another solvent is a water-immiscible organic solvent that serves as a solvent for the second monomer. The second solvent is selected from any class of water-immiscible organic solvents, comprising but not limited to hydrocarbons, halocarbons, ethers and other solvents. Some examples include toluene, chloroform, and dichloromethane.

An optimal pH for the polymerization step is approximately between 7 and 10, and the pH is maintained by the thorough stoichiometry of the reactants and presence of an acid acceptor in the mixture if any required.

In order that the invention may be more readily understood, reference is made to the following examples, which are intended to be illustrative of the invention, but are not intended to be limiting the scope.

EXAMPLES

Example 1

This example describes synthesis of a rigid rod-like macromolecule of the general structural formula (I), wherein $R_1$ is $CH_3$, M is Cs and k is equal to n.

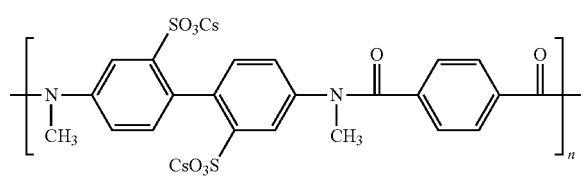

30 g 4,4'-Diaminobiphenyl-2,2'-disulfonic acid was mixed with 300 ml pyridine. 60 ml of acetyl chloride was added to the mixture with stirring and the resulting reaction mass agitated for 2 hrs at 35-45° C. Then it was filtered, the filter cake was rinsed with 50 ml of pyridine and then washed with 1200 ml of ethanol. The obtained alcohol wet solid was dried at 60° C. Yield of 4,4'-bis(acetylamino)biphenyl-2,2'-disulfonic acid pyridinium salt is 95%.

12.6 g 4,4'-bis(acetylamino)biphenyl-2,2'-disulfonic acid pyridinium salt was mixed with 200 ml DMF. 3.4 g sodium hydride (60% dispersion in oil) was added. The reaction mass was agitated 16 hrs at room temperature. 7.6 ml methyl iodide was added and the reaction mass was stirred 16 hrs at room temperature. Then the volatile components of the reaction mixture were distilled off and the residue washed with 800 ml of acetone and dried. The obtained 4,4'-bis[acetyl(methyl) amino]biphenyl-2,2'-disulfonic acid was dissolved in 36 ml of 4M sodium hydroxide. 2 g activated charcoal was added to the solution and stirred at 80° C. for 2 hrs. The liquid was clarified by filtration, neutralized with 35% HCl to pH~1 and reduced by evaporation to ~30% by volume. Then it was refrigerated (5° C.) overnight and precipitated material isolated and dried. Yield of 4,4'-bis[methylamino]biphenyl-2,2'-disulfonic acid was 80%.

2.0 g 4,4'-bis[methylamino]biphenyl-2,2'-disulfonic acid and 4.2 g cesium hydrocarbonate were mixed with 6 ml water. This solution was stirred with IKA UltraTurrax T25 at 5000 rpm for 1 min. 2 ml triethylene glycol dimethyl ether was added, followed by 4.0 ml of toluene with stirring at 20000 rpm for 1 min. Then solution of 1.2 g terephtaloyl chloride in 2.0 ml of toluene was added to the mixture at 20000 rpm. The emulsion of polymer was stirred for 60 min and then poured into 150 ml of ethanol at 20000 rpm. After 20 min of agitation the suspension of polymer was filtered on a Buchner funnel with a fiber filter, the resulting polymer dissolved in 8 ml of water, precipitated by pouring into of 50 ml of ethanol and dried 12 hrs at 70° C. Yield was 2.3 g.

Analytical control of synthesis and purity of final product (4,4'-bis[methylamino]biphenyl-2,2'-disulfonic acid) was carried out by ion-pair HPLC. HPLC analysis of the intermediate products and final product was performed with Hewlett Packard 1050 (Agilent, USA) system comprising automated sample injector, quatpump, thermostatted column compartment, diode array detector and ChemStation B10.03 software. Compounds were separated on a 15 cm×4.6 mm i.d., 5-µm particale, Dr. Maisch GmbH ReproSil-Pur Basic C18 column by use of a linear gradient prepared from acetonitrile (component A), water-solution of tetra-n-butylammonium bromide 0.01M (component B), and phosphate buffer 0.005M with pH=6.9-7.0 (component C). The gradient was: A-B-C 20:75:5 (v/v) to A-B-C 35:60:5 (v/v) in 20 min. The flow rate was 1.5 mL min$^{-1}$, the column temperature 30° C., and effluent was monitored by diode array detector at 230 and 300 nm.

Example 2

This example describes synthesis of a rigid rod-like macromolecule comprising n organic units of the first type having general structural formula I

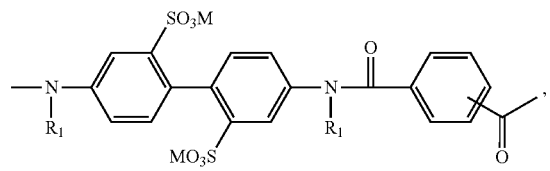

and
k organic units of the second type having general structural formula II

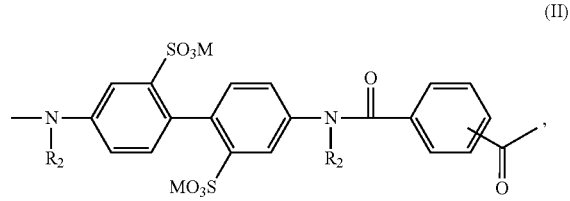

wherein n is in the range from 0 to 10,000, and k is in the range from 0 to 10,000, sum n+k≥10, $R_1$ is —H, $R_2$ is —$CH_3$, M is $Cs^+$. 4,4'-bis[methylamino]biphenyl-2,2'-disulfonic acid is obtained as described in Example 1. 0.8 g of 4,4'-bis[methylamino]biphenyl-2,2'-disulfonic acid, 0.72 g of 4,4'-bis[amino]biphenyl-2,2'-disulfonic acid and 3.29 g cesium bicarbonate were mixed with 6 ml water. This solution is stirred with IKA UltraTurrax T25 at 5 000 rpm for 2 min. 4.0 ml of toluene is added to the solution with stirring at 20 000 rpm for 5 sec. Then solution of 0.92 g terephtaloyl chloride in 2.0 ml of toluene is added to the mixture at 20000 rpm for 5 sec. The emulsion of polymer is stirred for 5 min.

The obtained foam plastic mass was dissolved with 150 ml of hot water and then the solution was poured to 400 ml of ethanol and stirred for overnight. Then the suspension of polymer is filtered on a Buchner funnel with a fiber filter.

The filter cake was dissolved with 40 ml of hot water and then the solution was poured to 160 ml of Ethanol and stirred for 40 min. The suspension of polymer was filtered on Buchner funnel through a fiber filter (D=90 mm) for 2 hrs. The filter cake (polymer mass) was dried at 80° C. under vacuum for 44 hrs. Yield of polymer was 1.97 g.

Molecular weight distribution of the polymer samples was determined by gel permeation chromatography (GPC). GPC analysis of the polymer samples was performed by Hewlett Packard 1050 HPLC system, with the diode array detector (λ=230 nm). The chromatographic separation was done using TSKgel G5000 $PW_{XL}$ column from TOSOH Bioscience. Phosphate buffer 0.2 M (pH=6.9-7.0) was used as the mobile phase. Chromatographic data were collected and processed using the ChemStation B10.03 (Agilent Technologies) and GPC software Cirrus 3.2 (Varian). Poly(para-styrenesulfonic acid) sodium salt was used as a GPC standard.

Number average molecular weight of polymer was Mn=24900, polydispersity PD=3.3.

Example 3

This example describes preparation of a solid optical retardation layer of negative C-type from a solution of a rigid rod-like macromolecule according to the present invention.

2 g of organic compound produced as described in Example 2 was dissolved in 100 g of de-ionized water (conductivity ~5 µSm/cm); the suspension was mixed with a magnet stirrer. After dissolving, the solution was filtered at the hydrophilic filter of a 45 µm pore size and evaporated to the viscous isotropic solution of concentration of solids of about 6%.

Fisher brand microscope glass slides were prepared for coating by soaking in a 10% NaOH solution for 30 min, rinsing with deionized water, and drying in airflow with the compressor. At a temperature of 22° C. and relative humidity of 55% the obtained LLC solution was applied onto the glass panel surface with a Gardner® wired stainless steel rod #14, which was moved at a linear velocity of about 10 mm/s. The solid optical layer was dried with a flow of the compressed air. The drying was not accompanied with any temperature treatment and took no more than several minutes.

In order to determine the optical characteristics of the solid optical retardation layer, optical retardation spectra at different incident angles were measured in a wavelength range from 400 to 700 nm using Axometrics Axoscan Mueller Matrix spectropolarimeter, and birefringence Δn was calculated using these data and the results of the physical film thickness measurements using Dektak³ST electromechanical contact profilometer. The obtained solid optical retardation layer was characterized by the thickness equal to approximately 750 nm and in-plane birefringence $Δn_{xy}$=0 in measured wavelength range, while out-of-plane birefringence was $Δn_{yz}$=$Δn_{xz}$=0.11 at the wavelength of 550 nm. The spectral dispersion of out-of-plane birefringence $Δn_{yz}$=$Δn_{xz}$=Δn is shown in FIG. 1.

Example 4

Figure 2:
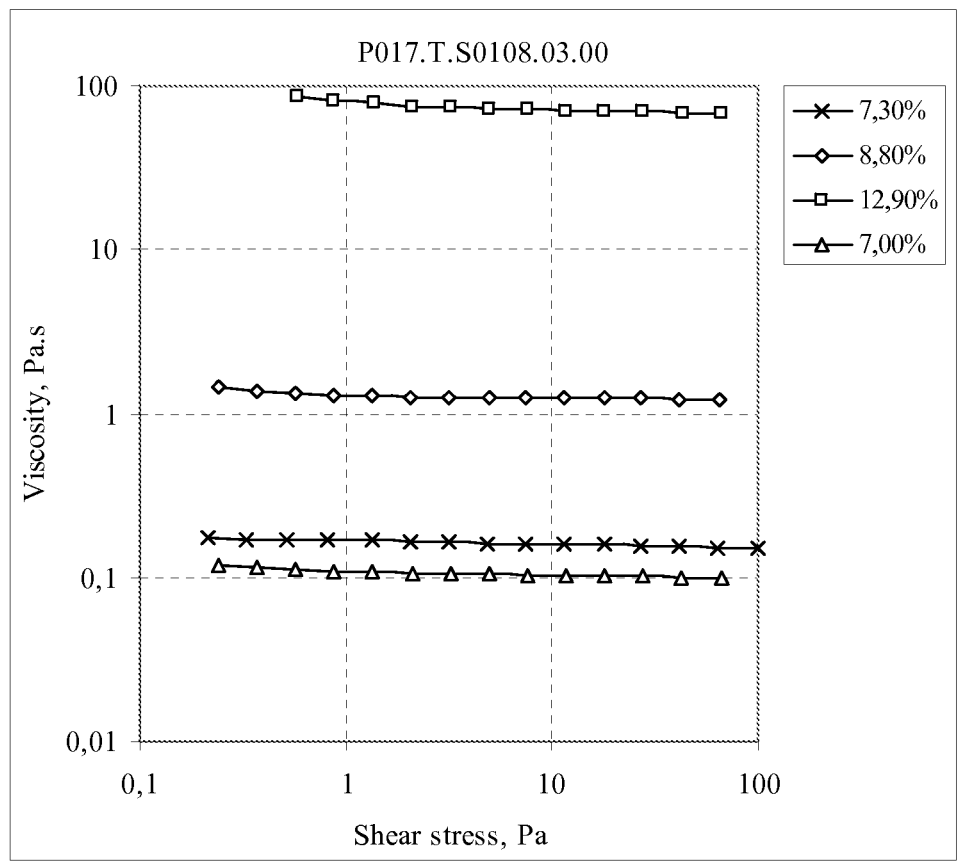
FIG. 2 shows the viscosity of a coating material at 25° C.
Figure 3:
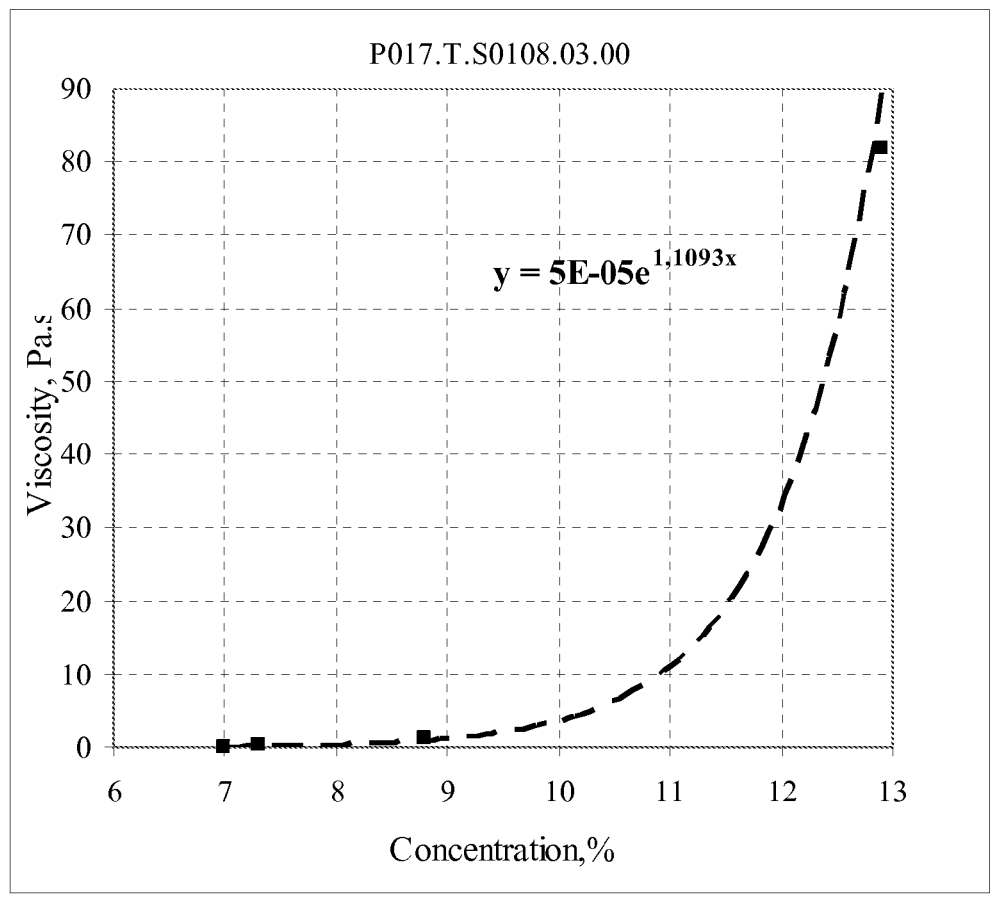
FIG. 3 shows the viscosity of a coating material (at shear stress=1 Pa) depending on concentration of solids (at 25° C.).
Figure 4:
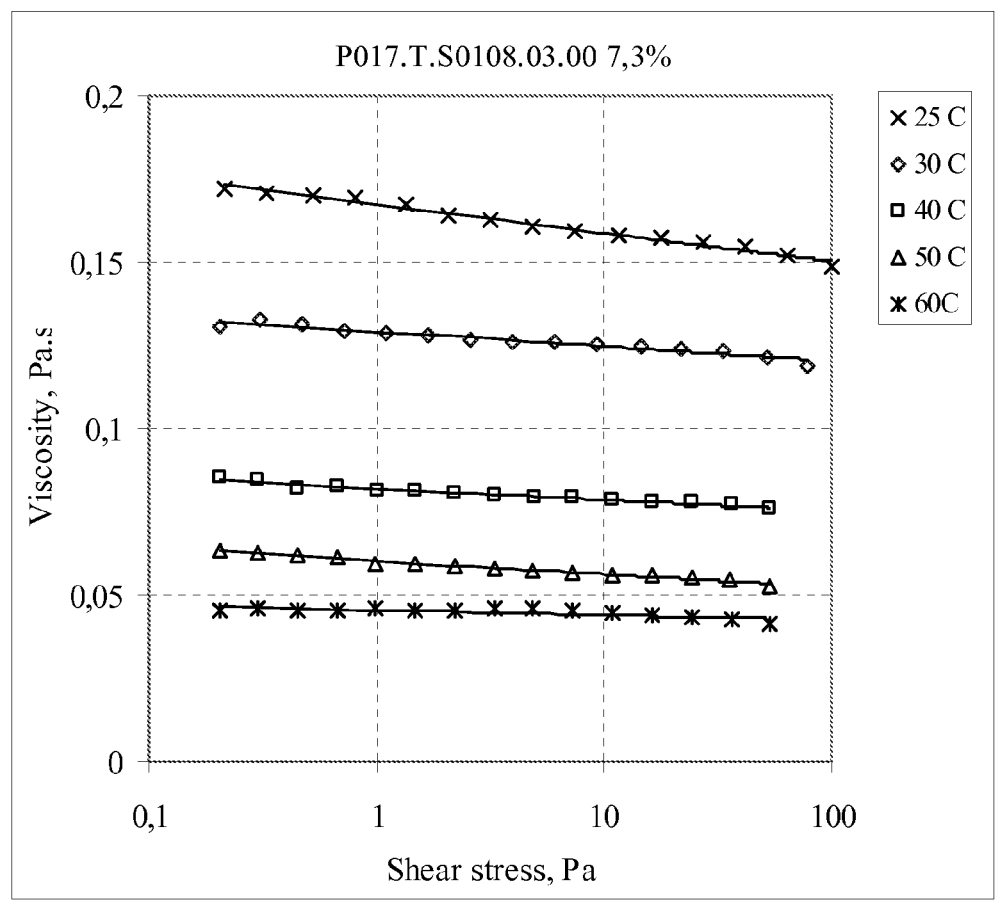
FIG. 4 shows the effect of temperature on viscosity.
Figure 5:
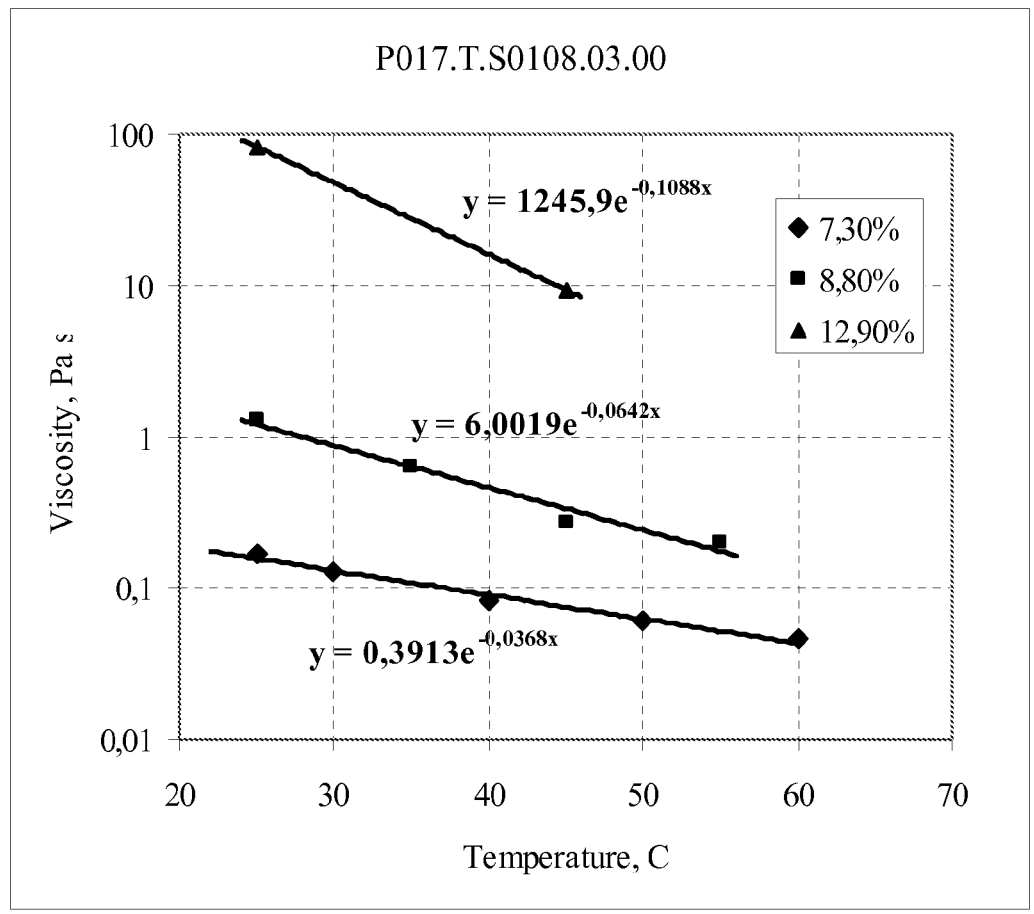
FIG. 5 shows the effect of temperature on viscosity at different concentrations (shear stress=1 Pa).

This example describes preparation of a solid optical film of negative C-type from a solution of a rigid rod-like macromolecule described in Example 1 of the present invention. Rheological properties of an isotropic solution of rigid rod-like macromolecules (aqueous LLC coating materials) have been studied. The measurements were performed using Rheometer AR 550. FIG. 2 shows effective viscosity curves of solutions of different concentrations at 25° C. These solutions show a slight pseudo-plastic flow characteristic, and in the region of shear which are typical for the normal coating conditions (15-100 s$^{-1}$), they are practically Newtonian liquids. FIG. 3 shows dependence of the effective viscosity of the negative C-plate retarder material on concentration. Such dependence can be approximated by an exponential function (shown in the same Figure). Concentration of the negative C-plate retarder material was tuned in such a way that effective viscosity was at the level of ~0.16-0.17 Pa*s; concentration was 7.3%. Dependence of effective viscosity on temperature is shown in FIGS. 4 and 5. Temperature of the coating material (at 7.3%-concentration) was fixed at 45 degrees C., which provides effective viscosity of ~0.17 Pa*s. This value of viscosity is the standard value for a solution intended for film manufacturing. Coatings were made using a mechanized stage Erichsen applicator with a heated substrate table and with a variable gap—Zehntner ZUA 2000/220 Universal applicator. Coating was made on glass plates of 230×380 mm. Coating regimes were optimized using the standard material formulation at 7.35% concentration and 45 degrees C. for the material and substrate. Thickness of the obtained films was measured by surface profiler Dektak 3ST. Thickness uniformity is the most important parameter, as it determines a film retardation. As soon as the developed LLC materials have very high birefringence (delta-n ~0.125) a very small deviation of thickness should be achieved. In the present example the maximum allowable variation of retardation was limited by 5% of the target value. Two different retardation values 250 nm and 500 nm, were targeted in this example. Thus the allowable thickness variation was less than 100 nm in the dry retarder film. The applicator was used to spread the material which was deposited by pipette along the applicator at the starting line on the substrate. Thickness of the coated layer depends on the applicator gap which is a distance between the applicator and the substrate surface, and a speed of the applicator movement.

Figure 6:
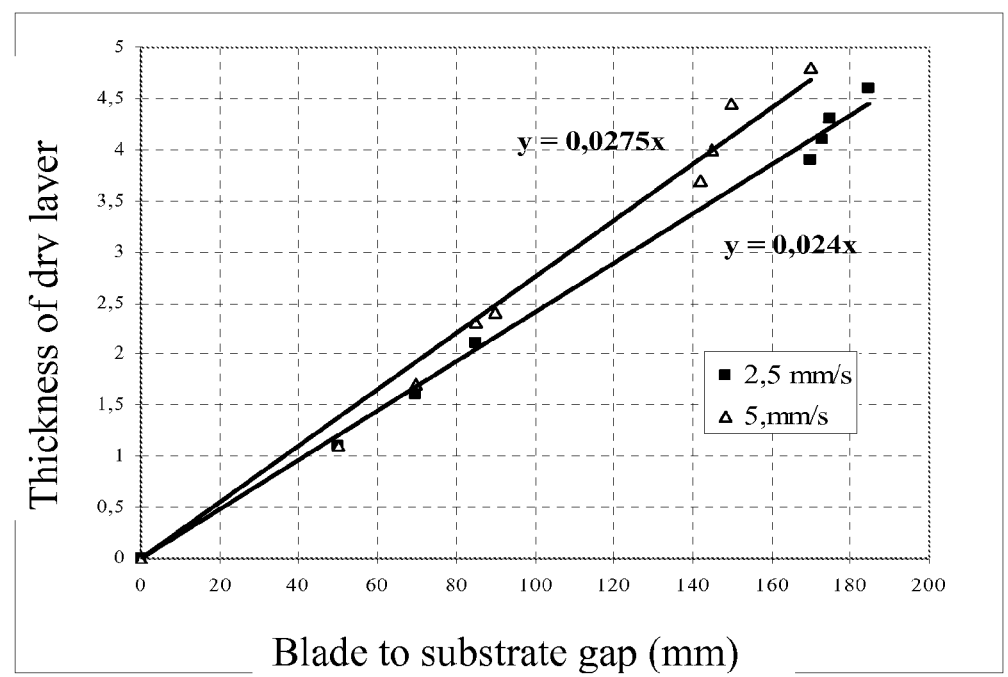
FIG. 6 shows the effect of the applicator gap (blade to substrate) on the thickness of dry layer.
Figure 7:
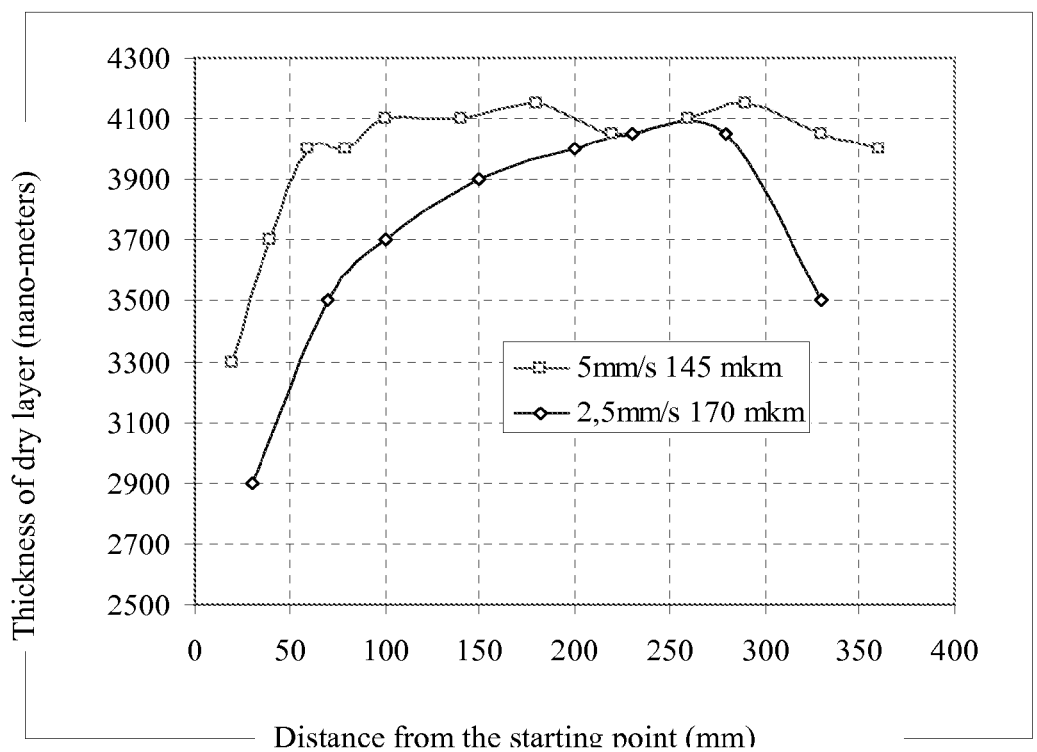
FIG. 7 shows the effect of the applicator speed on the thickness distribution (along the coating direction).
Figure 8:
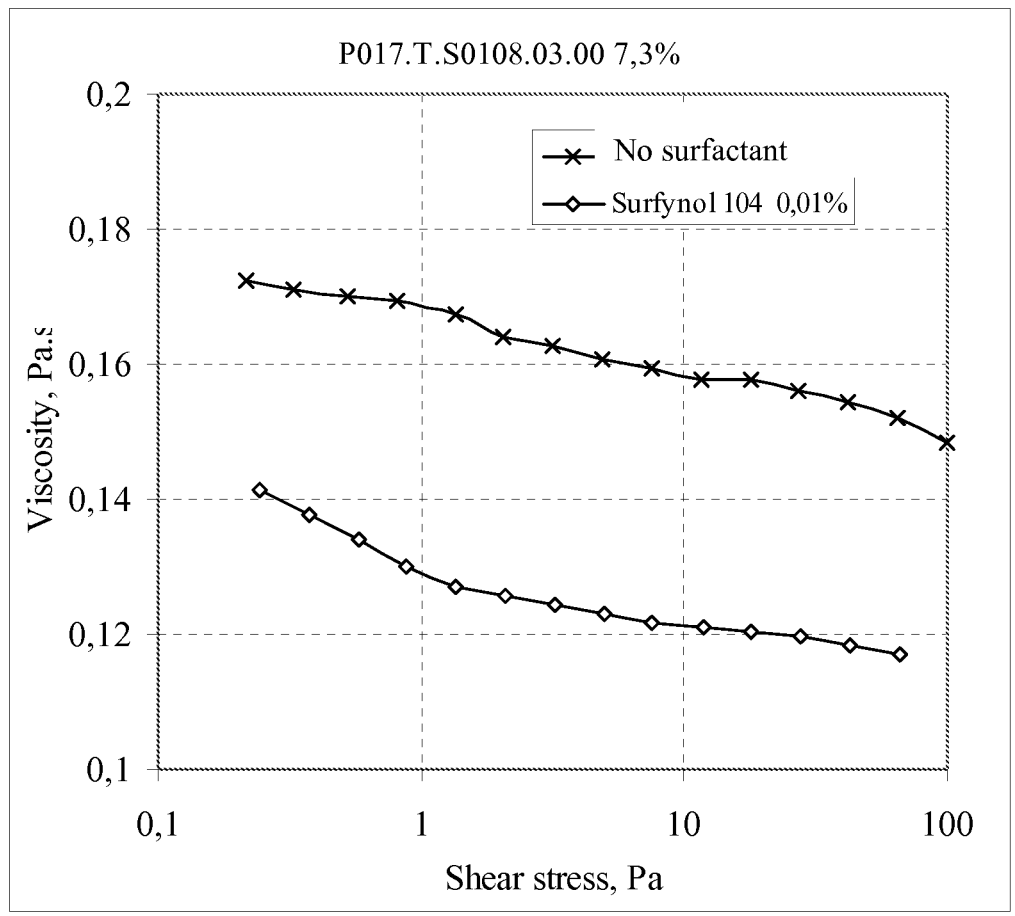
FIG. 8 shows the effect of surfactant (Surfynol 104) on viscosity.
Figure 9:
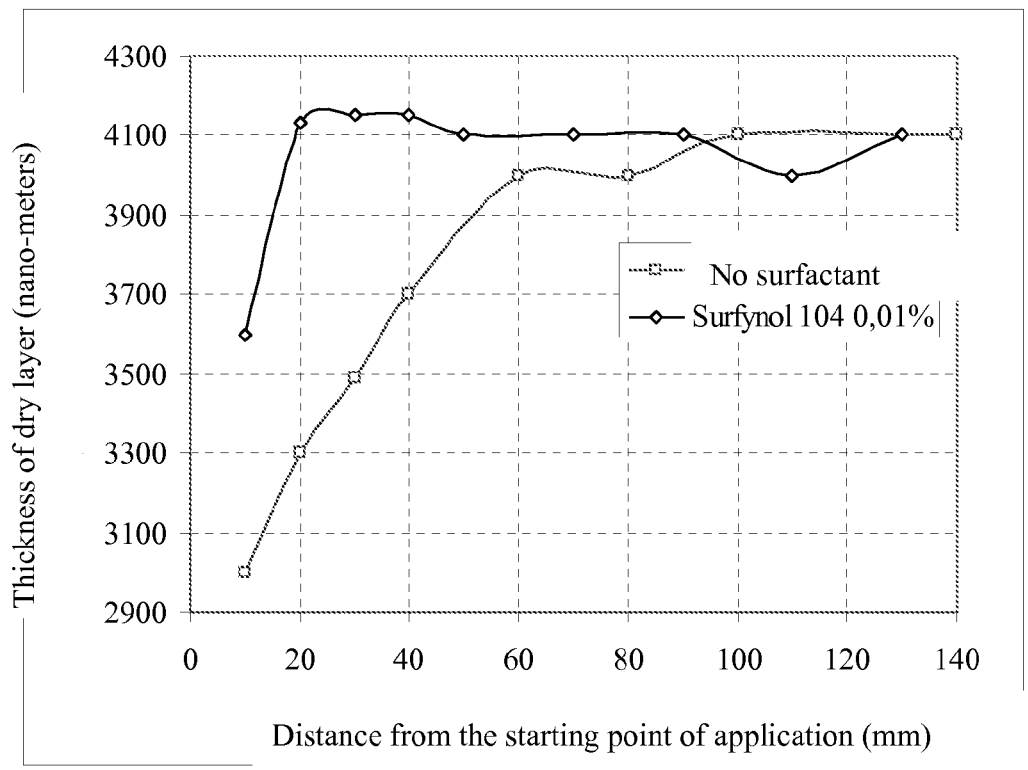
FIG. 9 shows the effect of surfactant on the thickness distribution (along the coating direction).

FIG. 6 show thickness of the dry film depending on the applicator gap at a speed of 2.5 and 5.0 mm/sec. Speed of the applicator movement affects thickness of the resulting wet layer, and the defects and thickness uniformity. "Healing" of some of the defects appearing in the film during coating at slow speeds is observed, which does not happen at higher speed. However, at a slow speed (as it is 2.5 mm/sec in this example) a longer "starting region" is observed where thickness value gradually reaches its stable maximum value The optimum applicator speed was found to be in the range of 5-10 mm/sec for the given material as at this speed thickness reaches its stable maximum value after about 50-70 mm from the starting line. Length of the starting region is mainly determined by the kinetics of wettability of the substrate and the applicator by the coating material. Surfactants are used to improve wettablity and they also can reduce appearance of defects in the coatings. The coated films were dried in open air at about 45 degrees C. Coated films exhibit 100% adhesion. Temperature stability tests were performed which demonstrated no degradation of the films if heated up to approximately 250 degrees C.

What is claimed is:

1. A macromolecule comprising n organic units of a first type having structural formula I

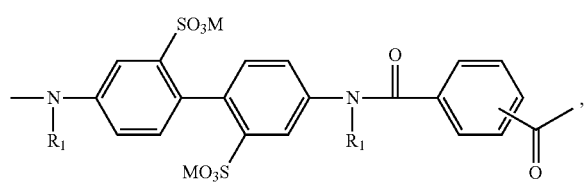

and k organic units of a second type having structural formula II

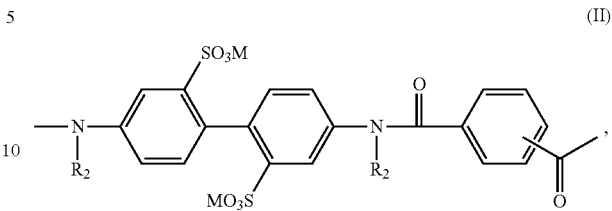

wherein n is in the range from 0 to 10,000, and k is in the range from 0 to 10,000, sum n+k≥10, $R_1$ and $R_2$ are side-groups independently selected from the list consisting of —H, -alkyl, —$(CH_2)_m SO_3 M$, —$(CH_2)_m Si(O\text{-}alkyl)_3$, —$CH_2$-aryl, and —$(CH_2)_m OH$, wherein m is a number from 1 to 18, and in case —H is one of the side-groups, then total number of —H does not exceed 50% of total number of side-groups in the macromolecule, and M is counterion selected from the list consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Al^{3+}$, $Ce^{3+}$, $Y^{3+}$, $Yb^{3+}$, $Gd^{3+}$, $Zr^{4+}$ and $NH_{4-p}Q_p^+$, where Q is selected from the list consisting of linear and branched ($C_1$-$C_{20}$) alkyl, ($C_2$-$C_{20}$) alkenyl, ($C_2$-$C_{20}$) alkynyl, and ($C_6$-$C_{20}$) arylalkyl, and p is 0, 1, 2, 3 or 4.

2. A macromolecule of claim 1, wherein the carbonyl group on the phenyl ring of at least one of the organic units is at the para- or the meta-position.

3. A macromolecule of claim 1, wherein the carbonyl group on the phenyl ring of at least one of the organic units is at the para-position.

4. A macromolecule of claim 1, wherein the carbonyl group on the phenyl ring of at least one of the organic units is at the meta-position.

5. A macromolecule of claim 1, wherein the carbonyl group on the phenyl ring of both of the organic units is at the para- or the meta-position.

6. A macromolecule of claim 1, wherein the carbonyl group on the phenyl ring of the organic unit of the first type is at the para-position and the carbonyl group of the phenyl ring of the organic unit of the second type is at the meta-position.

7. A macromolecule of claim 1, wherein $R_1$ and $R_2$ are side-groups independently selected from the list consisting of —H, -alkyl, and —$(CH_2)_m SO_3 M$; and M is an alkali metal.

8. A macromolecule of claim 1, wherein $R_1$ is —H, $R_2$ is —H, and M is an alkali metal.

9. A macromolecule of claim 1, wherein $R_1$ is —H, $R_2$ is —H, and M is $Na^+$.

10. An optical film comprising at least one solid optical retardation layer, wherein the solid optical retardation layer comprises a macromolecule of claim 1.

11. The optical film of claim 10, wherein the macromolecule is isotropically oriented in the plane of the solid optical retardation layer.

12. The optical film of claim 10, wherein the solid optical retardation layer is substantially transparent to electromagnetic radiation in the visible spectral range.

13. The optical film of claim 10, wherein the solid optical retardation layer is a negative C-type.

14. A method of producing an optical film, comprising the steps of a) preparation of a solution of the macromolecules of claim 1;

b) application of a liquid layer of the solution onto a substrate; and c) drying the liquid layer to form a solid optical retardation layer.

15. The method of claim 14, wherein the substrate is selected from the list comprising polymer and glass.

16. The method of claim 14, wherein the method further comprises a pre-treatment step before the application onto the substrate of making the substrate surface hydrophilic.

17. The method of claim 14, wherein the method further comprises a pre-treatment step before the application onto the substrate of application of a planarization layer.

18. The method of claim 14, wherein the method further comprises a post-treatment step after drying the substrate comprising treatment of the substrate with a solution of any inorganic salt of a cation selected from the list comprising $H^+$, $Ba^{2+}$, $Pb^{2+}$, $Ca^{2+}$, $Mg^{2+}$, $Sr^{2+}$, $La^{2+}$, $Zn^{2+}$, $Zr^{4+}$, $Al^{3+}$, $Ce^{3+}$, $Y^{3+}$, $Yb^{3+}$, $Gd^{3+}$ and any combination thereof soluble in water or any solvent mixable with water.

19. The method of claim 18, wherein the solvent is selected from the list comprising water, alkaline aqueous solutions, dimethylsulfoxide, dimethylformamide, dimethylacetamide, tetrahydrofurane, dioxane, and combination thereof.

20. The method of claim 14, wherein the application step is carried out using a coating technique selected from the list comprising spin-coating, spray-coating, printing, casting and molding.

21. The method of claim 14, wherein the solution additionally comprises a surfactant.

\* \* \* \* \*